United States Patent [19]

McArdle

[11] Patent Number: 4,534,704
[45] Date of Patent: Aug. 13, 1985

[54] HELICOPTER ROTOR CONTROL SYSTEM WITH INTEGRATED HUB

[75] Inventor: Francis H. McArdle, Norristown, Pa.

[73] Assignee: The Boeing Company, Seattle, Wash.

[21] Appl. No.: 464,810

[22] Filed: Feb. 8, 1983

[51] Int. Cl.³ .............................................. B64C 27/72
[52] U.S. Cl. ..................................... 416/158; 416/98; 416/48
[58] Field of Search ............. 416/158, 114, 98, 157 A, 416/156

[56] References Cited

U.S. PATENT DOCUMENTS

| | | | |
|---|---|---|---|
| 2,427,939 | 9/1947 | Woods | 416/158 X |
| 2,491,260 | 12/1949 | Green | 416/98 |
| 2,653,671 | 9/1953 | Martin et al. | 416/158 X |
| 2,667,229 | 1/1954 | Allen | 416/158 |
| 2,703,147 | 3/1955 | Peterson | 416/98 |
| 3,303,887 | 2/1967 | Pfleiderer | 416/158 X |
| 3,393,750 | 7/1968 | You | 416/158 X |
| 4,348,155 | 9/1982 | Barnes et al. | 416/158 X |
| 4,379,678 | 4/1983 | Carlock et al. | 416/98 |
| 4,422,828 | 12/1983 | Sambell | 416/158 X |
| 4,445,421 | 5/1984 | Walker | 416/114 X |

FOREIGN PATENT DOCUMENTS

| | | | |
|---|---|---|---|
| 345622 | 5/1960 | Switzerland | 416/158 |
| 605561 | 7/1948 | United Kingdom | 416/158 |
| 605045 | 7/1948 | United Kingdom | 416/158 |
| 214726 | 8/1968 | U.S.S.R. | 416/156 |

Primary Examiner—Everette A. Powell, Jr.
Attorney, Agent, or Firm—Jones, Tullar & Cooper

[57] ABSTRACT

A rotor control system for a helicopter in which the conventional swashplate is eliminated and the rotor hub is integrated to include an actuator for each rotor blade. Two arrangements are employed, each of which utilizes a hydraulic circuit. One arrangement is a hydromechanical arrangement with stick control, while the other arrangement is an electro-hydraulic fly by wire arrangement. The latter does not employ a swashplate, while the former employs a modified swashplate. The controls, like the actuators, are mounted in the rotor hub, and the hydraulic lines and fiber optics pass through the rotor drive shaft to the rotor hub.

17 Claims, 6 Drawing Figures

HELICOPTER ROTOR CONTROL SYSTEM WITH INTEGRATED HUB

BACKGROUND OF THE INVENTION

1. Field of the Invention

This invention relates to the rotor control system of a helicopter, and in particular to such a system in which each rotor blade can be controlled individually and without a conventional swashplate.

2. Prior Art

The swashplate has been the heart of the helicopter control system from the inception of the helicopter and continues in a critical role even today. See, for example, U.S. Pat. Nos. 1,909,845, 2,338,923, 2,494,209, 3,050,274, 3,841, 586, 3,972,491, 4,027,999, and 4,243,385.

The swashplate has served as probably the single most important component of the rotor control system for transferring both collective and cyclic control to the rotor. It is, of course, an essentially mechanical system which is subjected to a variety of loads, ranging from fatigue loads resulting from flight conditions to the loads associated with applying control to the rotor. Traditionally, the swashplate has been relatively heavy, a result of the often severe loading to which it is subjected. The structural integrity of the swashplate is crucial to the survivability of the helicopter, and consequently factors of safety needed to be high in designing the swashplate.

In recent years, composite materials have found greater application in the design of helicopters due to the ability which composite materials offer for load redundancy and weight savings. The major area of application for composite materials, however, has been in the upper rotor head. See, for example, U.S. Pat. Nos. 4,095,322, 4,247,255 and 4,316,701. The swashplate has somehow eluded the advance of composite materials, at least in most helicopters now flying. No doubt that the application of composite materials to helicopters will continue and reach the swashplate as well. Even so, the result will be less, in terms of weight at least, than a control system without a conventional swashplate.

Integration, i.e., the coordination of separate and diverse components into a more manageable system, is becoming evident in helicopter design. See, for example, U.S. Patent Nos. 3,080,002, 3,486,832 and 4,302,154. These patents disclose an integration of sorts in which the helicopter transmission is integrated with the rotor drive shaft and swashplate. Here again, the swashplate occupies a central role.

OBJECTS AND SUMMARY OF THE INVENTION

With advances in hydraulics and fiber optics, for example, integration in which at least the conventional swashplate is eliminated as a major component of the rotor control system is now possible.

An object of this invention is, therefore, to provide the state-of-the-helicopter rotor control art with a rotor control system in which the rotor blades are controlled individually without a conventional swashplate, at least in the main control system.

It is also an object of this invention to provide the state-of-the-helicopter rotor control art with a rotor control system in which the role of the rotor hub is expanded Another object of this invention is to provide the state-of-the-helicopter rotor control art with the rotor control system envisioned by the previously stated objects having a hydraulic system possessing a regenerative feature.

Another object of this invention is to provide the state-of-the-helicopter rotor control art with the rotor control system envisioned by the previously stated objects which further possesses a safety override feature.

Another object of this invention is to provide the state-of-the-helicopter rotor control art with the rotor control system envisioned by the previously stated objects which further possesses control capability to the rotor blades beyond pilot input controls.

According to one aspect of the invention, the role of the rotor hub is expanded and the swashplate in its conventional form is eliminated. Rotor blade pitch control is achieved for individual blades by, for example, a rotary hydraulic actuator mounted within the rotor hub for each blade. Rotor hubs can also be designed with piston type actuators. In either case the hydraulic actuators are controlled by a hydraulic circuit with mechanical pilot input to the circuit. A hydro-mechanical servo valve for cyclic control is associated with each hydraulic actuator. The hydro-mechanical servo valve is connected to a hydraulic line supplied by a hydraulic pump. Each servo valve would receive a cyclic control input utilizing a simplified swashplate. For collective control a single additional hydro-mechanical servo valve is employed which is connected by a hydraulic line supplied by the hydraulic pump. The servo valves are located in the rotor hub adjacent to the actuators which they control. Preferably, the hydraulic pump is driven by the rotor drive shaft and the hydraulic lines pass through the rotor drive shaft to the rotor hub.

In an alternate fly by wire arrangement for accomodating control signal inputs such as pilot input, higher harmonic and gust alleviation control signals, an electro-hydraulic circuit is provided for each hydraulic actuator, including an electro-hydraulic servo valve and a mixing valve to which both the cyclic hydro-mechanical and electro-hydraulic servo valves are connected to hydraulic flow control. In this arrangement, the mixing valve is connected to the hydraulic actuator. The electro-hydraulic servo valves and the mixing valves are also located in the rotor hub adjacent to the actuators which they control. For multiple control signals, a signal resolution circuit is provided (summing circuit).

With electrical control, electrical transmission can achieved utilizing fiber optics which can also pass through the rotor drive shaft to the rotor hub. Optical slip rings would, in this case, be necessary.

The elimination of the conventional swashplate and mounting of the actuators, servo valves and mixing valves directly into the rotor hub results in an intergation not previously known.

BRIEF DESCRIPTION OF THE DRAWINGS

A preferred embodiment of the invention is illustrated in the six figures comprising the drawing, of which.

DETAILED DESCRIPTION

The preferred embodiment illustrated and described hereinafter achieves integration of the rotor hydraulic control system into the rotor hub, eliminates the conventional bulky swashplate and related parts, includes a regenerative type hydraulic circuit which can save a considerable portion of the input horse power of a conventional hydraulic circuit, and has the capacity to accommodate control signals which originate from sources other than pilot input, for example, higher harmonic and gust alleviation control signals, in a fly by wire arrangment.

Figure 1:
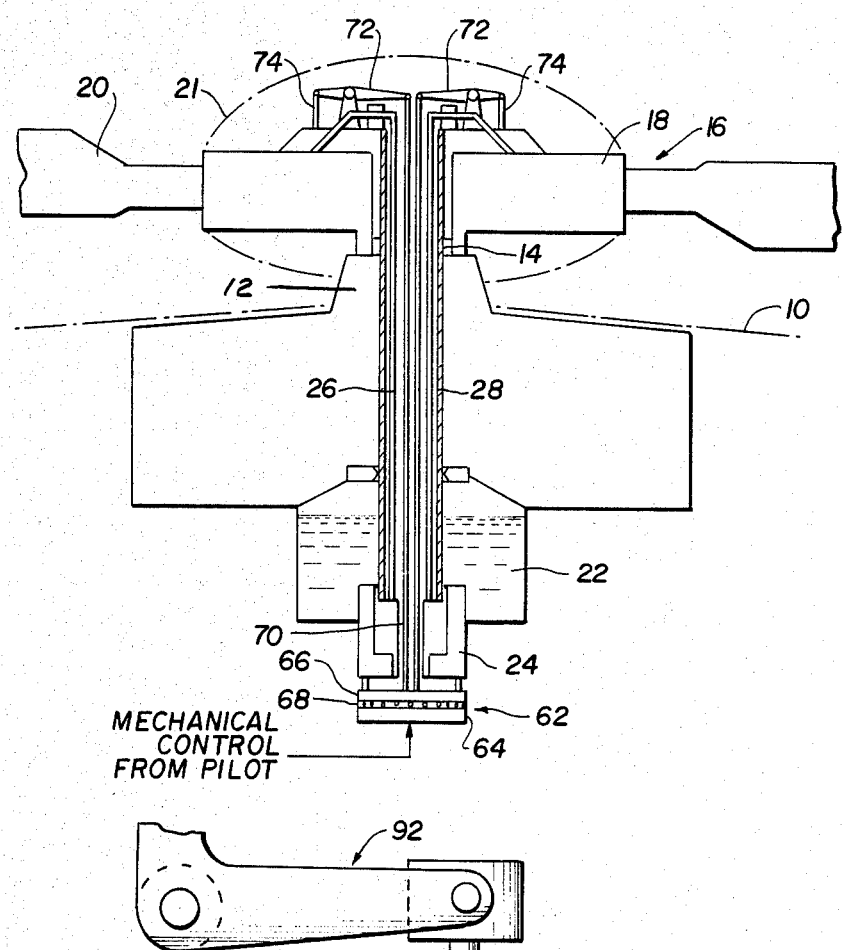
FIG. 1 is a schematic illustration in elevation of part of a rotor system and transmission of a helicopter including part of an integrated hydraulic system according to the present invention.

FIG. 1 depicts the main rotor region of the helicopter 10. A transmission 12 is shown which is mounted to the helicopter fuselage in a known manner. The transmission 12 converts the high engine RPM to rotor RPM at the rotor drive shaft 14. Connected to the rotor drive shaft 14 is the rotor assembly 16 which includes a rotor hub 18 and attached blades 20. The rotor hub 18 and its integrated components are situated within a fairing 21 of standard design.

A hydraulic reservoir or sump 22 is provided from which hydraulic fluid is pumped by a pump 24 through a hydraulic line 26. Preferably, the hydraulic reservoir 22 is mounted to the housing of the transmission 12 and the hydraulic line 26 extends through a cylindrical column or mast 28. The column 28 extends into the hydraulic reservoir 22 through the transmission 12 and up into the rotor hub 18. By encasing the hydraulic line 26 within the cylindrical column 28 from the hydraulic reservoir 22 and up through the rotor hub 18, special seals are unnecessary. In the preferred design, the rotor shaft 14 is situated concentric with the cylindrical column 28 which is, for example, splined to the rotor shaft 14 for rotation therewith. For simplicity, however, the connection of the rotor shaft 14 and the column 28 within the transmission 12 is not shown.

Figure 3:
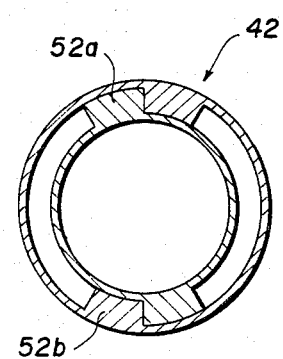
FIG. 3 is a simplified view of the hydraulic actuator showing the relationship of the vanes.
Figure 2:
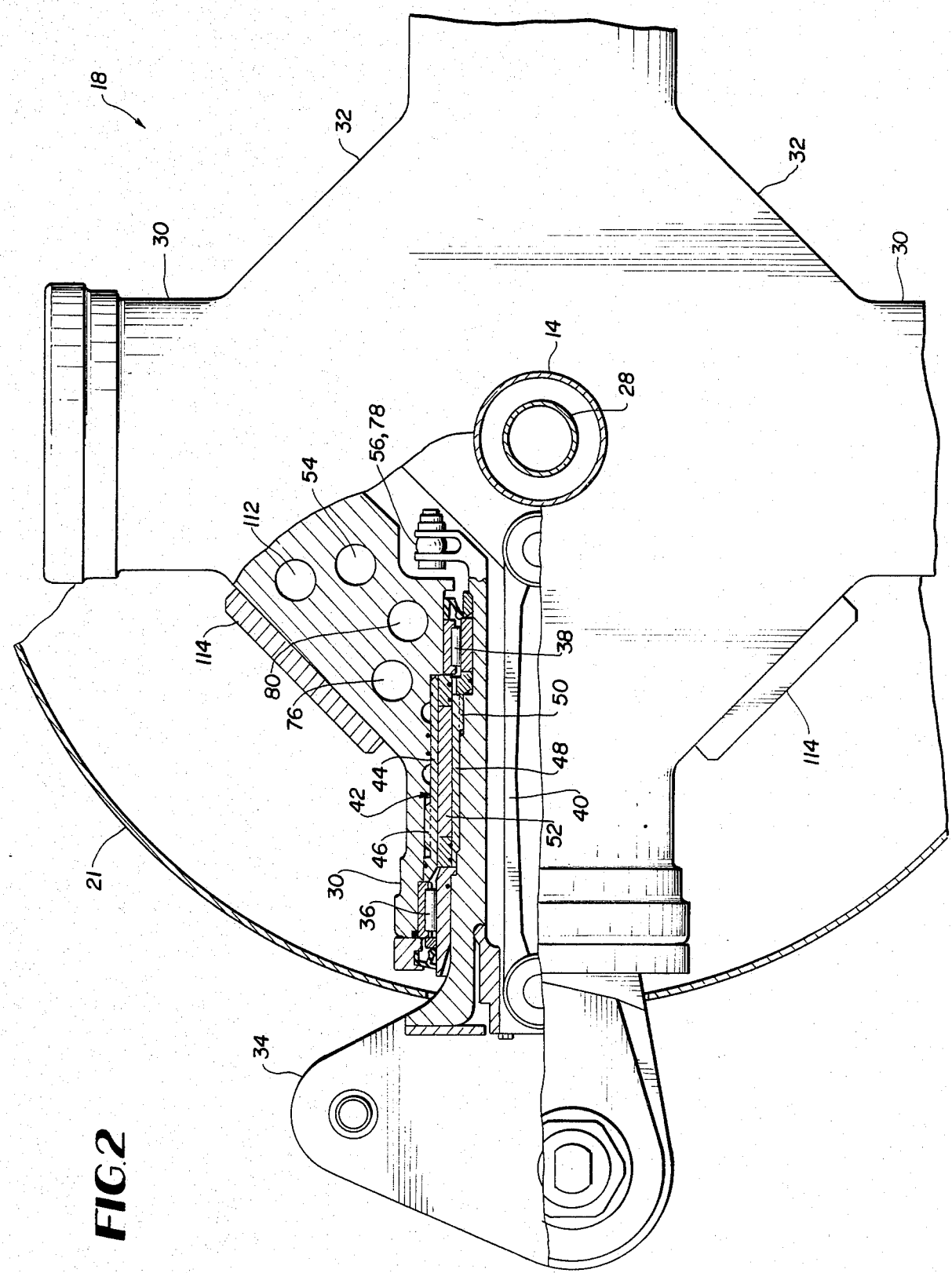
FIG. 2 is a partial planar top view; of an integrated rotor hub of the rotor system according to the present invention.

As seen in FIG. 2 the rotor hub 18 comprises a unitary structure with a multiplicity of extensions or arms 30 joined by web portions 32. There are as many arms 30 and web portions 32 as there are blades in the rotor system, and in the embodiment shown four arms are provided, one of which is shown in detail. Each arm 30 defines a hollow cylinder within which a pitch housing 34 is mounted with bearings 36 and 38 for rotation. A rotor blade is attached to the outboard end of the pitch housing 34. The particular configuration of the outboard end of the pitch housing 34 shown in FIG. 2, is conventional for the so-called rigid rotor system. Within the pitch housing 34 there is mounted, in a known manner, a tension-torsion strap 40. Between the bearings 36 and 38 a rotary actuator 42 is mounted. The rotary actuator 42 includes an outer housing 44 which is, for example, splined as at 46 to the arm 30, and an inner housing 48 which is splined, for example, by splines 50 to the pitch housing 34. The housings 44 and 48 include circumferentially extending vanes 52a, 52b (FIG. 3) which are acted upon by the hydraulic fluid to produce a rotational displacement of the inner housing 48 relative to the outer housing 44. This rotational displacement will in turn produce a corresponding rotational displacement of the pitch housing 34 due to the splined connection between the inner housing 48 and the pitch housing 34.

Figure 4:
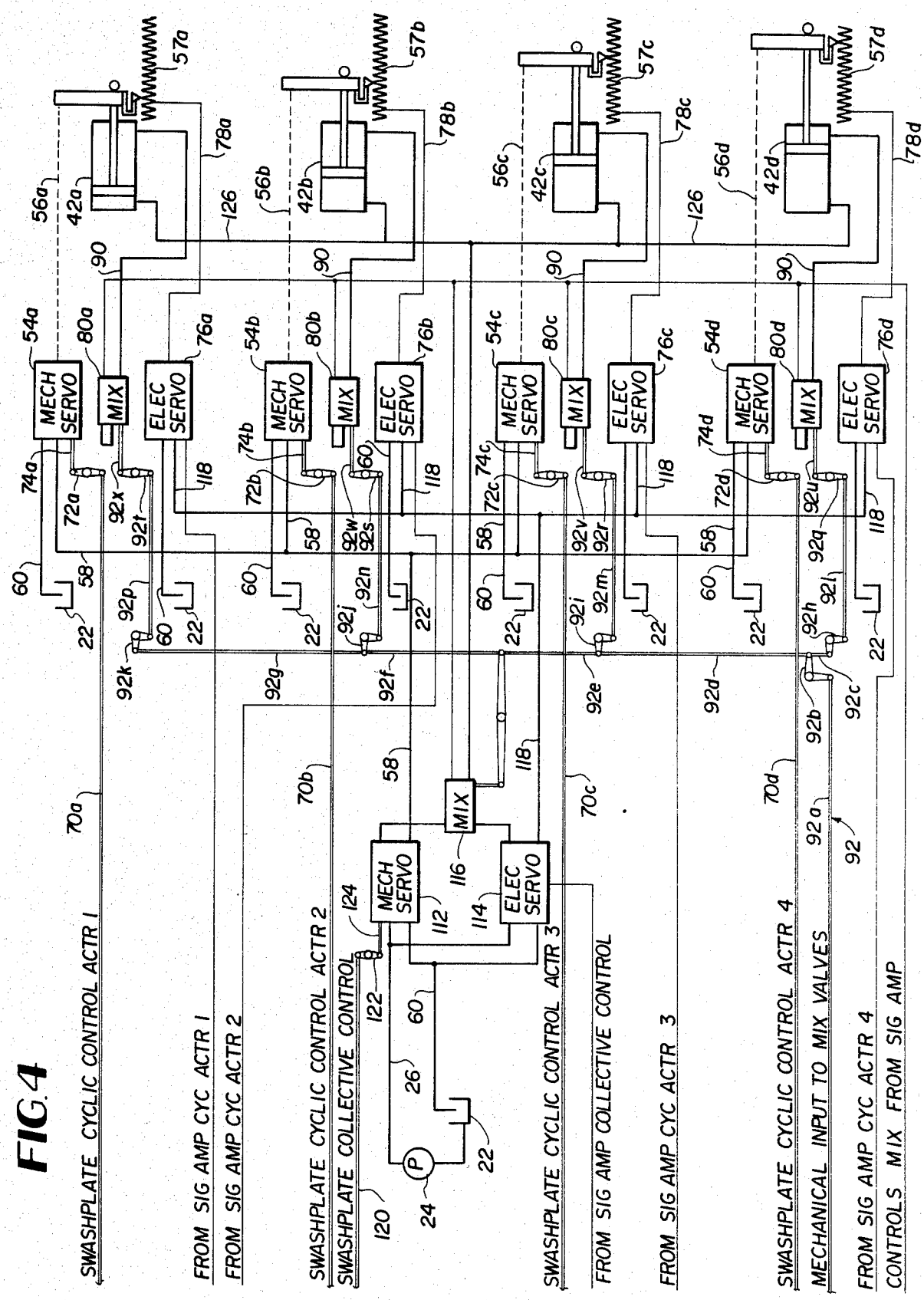
FIG. 4 is a block diagram of the hydraulic circuit of the present invention.

The operation of the hydraulic circuit can be better understood by reference to FIG. 4 which shows the elements of the hydraulic circuit located in the hub 18. Since the preferred embodiment includes four rotor blades, four actuators 42a, 42b, 42c, and 42d are included. As noted above, the actuators 42a, 42b, 42c, and 42d are rotary actuators. They can also be, as noted previously, piston type actuators. For simplicity of explanation, the piston type configuration is illustrated in FIG. 4. Each actuator has a cyclic hydromechanical servo valve 54a, 54b, 54c, and 54d each with a typical feedback mechanism 56a, 56b, 56c, and 56d from its respective actuator. Each hydro-mechanical servo valve 54a, 54b, 54c, and 54d is conncected to a hydraulic feed line 58, which in turn in connected to the feed line 26 extending up through column 28. Each hydro-mechanical servo valve 54a, 54b, 54c, and 54d is also connected to a hydraulic return line 60 as are the actuators. Hydraulic return line 60 is connected to a hydraulic line which extends through the column 28 to the reservoir 22. The return line 60 is not shown extending through the column 28 in FIG. 1, but is indicated in FIG. 4.

In a mechanical arrangement, the hydro-mechanical servo valves 54a, 54b, 54c, and 54d are connected by an appropriate mechanical linkage to the cyclic control sticks in the helicopter cockpit. The control linkages can pass through the column 28 as does the hydraulic line 26 as shown in FIG. 1. In FIG. 1 a swashplate 62 is shown having a stationary portion 64 and a rotating portion 66 separated by bearing 68. A control rod 70a–70d for each hydro-mechanical servo valve extends from the rotating portion 66 up the column 28 to the rotor 18. At the rotor 18 each rod 68 is connected to one arm of a lever 72a–72d which is pivotally mounted to the hub 18. The other arm of the lever has a valve control lever 74a–74d connected thereto. This lever is connected to a respective hydro-mechanical servo valve. The swashplate 62 can be considerably reduced in size, configuration and complexity relative to the conventional swashplate because it is essentially isolated from rotor head aerodynamic loads by reason of the fact that is connected to the hydro-mechanical servo valves and not directly to the pitch housings as is the conventional swashplate.

In a fly by wire arrangement, both the hydraulic system and the electrical system are employed, without stick control or modified with some stick control. Each actuator is further provided with an electro-hydraulic servo valve 76a–76d, each with feedback control 78a–78d. The feedback control is preferably formed as part of the feedback control for the valves 54a–54d and comprises, as an example, a potentiometer 57a–57d. Each electro-hydraulic servo valve receives a signal from the electrical circuit shown in FIG. 6, for controlling the quantity of hydraulic fluid delivered to it from a feed line 118 and the quantity of hydraulic fluid returned through the return line 60. The feed line 118 forms part of the collective control circuit which will be discussed thereinafter.

Figure 5:
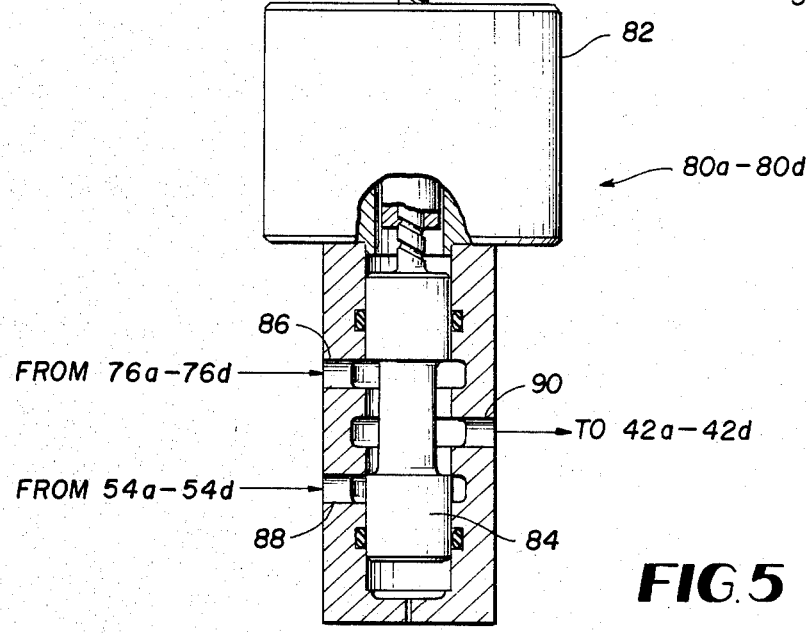
FIG. 5 is a partial cross-sectional view in elevation of a mixing valve for controlling the delivery of hydraulic fluid to the rotary hydraulic actuator in accordance with the present invention.

A mixing valve 80a–80d is provided for phasing the control from each arrangement. Details of the mixing valve are shown in FIG. 5. Each mixing valve 80a–80d includes a hollow shafted stepper motor ball screw drive 82 which controls the position of a spool 84. The spool 84, in turn controls the extent to which the ports 86 and 88 from the servo valves 76a–76d and 54a–54d repsectively, are opened for communicating hydraulic fluid and consequently pressure through to the port 90 which feeds the actuators 42a–42d. By controlling the location of the spool 84 to close port 86, the control can be 100% hydro-mechanical (stick control), or to close port 88, the control can be 100% fly by wire, or any proportional closing therebetween. The motor drive 82 is controlled from a switch in the cockpit. As a safety feature, a mechanical overriding mechanism 92 is provided which can be manually controlled from the cockpit. The mechanical overriding mechanism comprises the typical series of rods and bellcranks 92a–92n and 92p–92x as shown. Maintaining the availability of the hydro-mechanical arrangement also serves as a safety feature in the event of a failure in the fly by wire arrangement.

Figure 6:
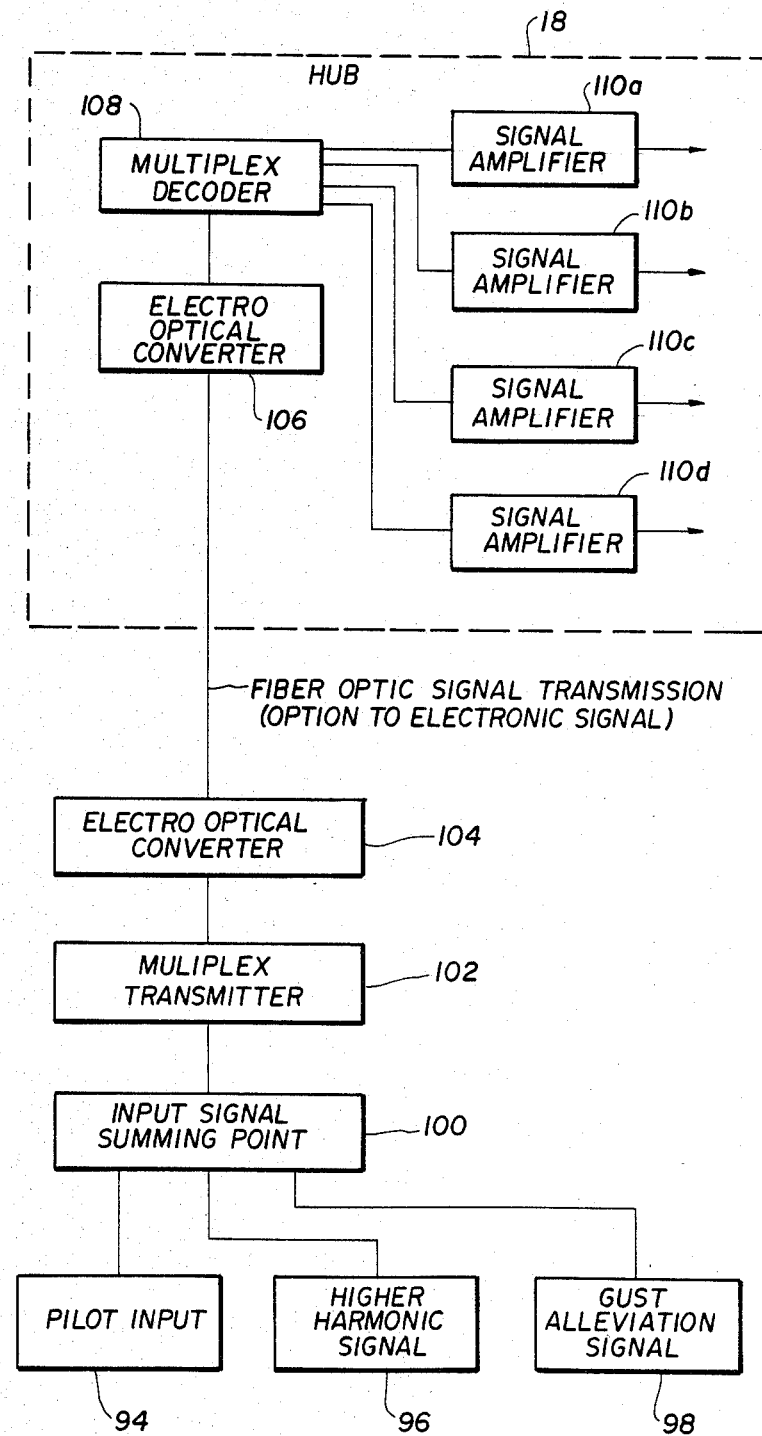
FIG. 6 is a block diagram of the electrical circuit in a fly by wire arrangment according to the present invention.

The electrical circuit for the fly by wire arrangement, which provides signals to the electro-hydraulic servo valves 76a–76d, is shown in Fig.6. This circuit includes a pilot input signal circuit 94 and, for example, a higher harmonic signal circuit 96 and a gust alleviation circuit 98. The signals from these circuits are derived from computers in these circuits. The controls are cyclical and are phase shifted in accordance with the number of blades in the rotor system, in this case by 90°. The collective control is derived from the computer in the pilot input circuit from which cyclic control is also derived. To be useful these signals must be resolved, i.e., added in a summing circuit 100 and thereafter multiplexed for transmission. Multiplexing occurs in the multiplex transmitter 102 for transmission by the electro-optical converter 104 through fiber optics to the components in the rotor hub 18, and at the rotor hub 18 connected by appropriate slip rings to an electro-optical converter 106. From the converter 106 the signal is decoded by a multiplex decoder 108 into four control signals applied through amplifiers 110a–110d to the electro-hydraulic servo valves 76a–76d with the effect noted above.

If the pilot desires to fly by using the control sticks, he adjusts the spool 84 so that it closes port 86 thereby disconnecting control from the circuits 94, 96 and 98. If the pilot desires to fly by wire, he adjusts the spool 84 so that it closes port 88 thereby neutralizing any effect from the control sticks. In either case, the hydraulic circuit is utilized to apply the appropriate hydraulic pressure to the individual actuators for both collective and cyclic control. The cyclic control would oscillate relative to the collective control.

For collective control hydro-mechanical valve 112 and electro-hydraulic valve 114 are provided, along with a mixing valve 116 (FIG. 4). Preferably, and as shown, the collective control is integrated with the cyclic control in that the line 58 is connected to the valve 112 and the line 118 is connected to the valve 114. During cyclic control the valves 112 and 114 are passive. For mechanical collective control the linkage 120, 122, and 124 is provided to the valve 112. For fly by wire control the valve 114 receives an input from a signal amplifier (FIG. 6), and in turn effects an appropriate flow through feed line 118.

A regenerative feature of the invention is also proposed whereby the collective circuit, line 126, connects adjacent actuators. This connection permits a force from the actuator associated with a retreating blade, to assist driving the actuator of an advancing blade. Blade angle is effected and maintained thru the combined action of the collective control servo valves 112 and 114, also the cyclic control valves 76a–76d and 54a–54d. The collective servos control the collective position of the actuators by controlling the summed output of all the actuators as a whole. The cyclic servos control the specific blade angle of each actuator through direct control of each actuator.

The resultant integrated hub is aerodynamically clean, offering a smaller drag profile than comparable existing rotor systems. The system is fail safe due to the two arrangements. It is also efficient due to the regenerative feature and the fact that all control linkages and parts are totally enclosed within the stack and hub except for those on top of the hub. All control linkages are low force/low load components, and no pressure seals are needed because of the connection of the stack of the hydraulic reservoir. In FIG. 2 holes are shown where the components noted above would be mounted. The mounting location is easily accessible to the hydraulic lines, fiber optics and mechanical controls coming from the stack 28, and is also easily accessible for maintenance by the removal of a plate 114.

We claim:

1. A rotor control system for a helicopter, comprising:
   a rotor hub having a plurality of rotor blade attaching arms, each arm defining a longitudinal axis, which axes intersect at the center of the rotor hub;
   actuator means mounted to each blade attaching arm; and
   means for producing rotation of each actuator means independently of its respective attaching arm and relative to the longitudinal axis of its respective attaching arm, wherein each actuator means comprises a hydraulic actuator, wherein the means for producing rotation of each actuator means comprises a hydraulic circuit including a pump, a hydraulic line for each actuator connected to the pump and to a respective actuator, and control means for controlling the flow of hydraulic fluid through the hydraulic lines, and wherein the control means are mounted in the rotor hub.

2. The rotor control system as defined in claim 1, further comprising:
   a pitch housing mounted to each blade attaching arm for rotation about the longitudinal axis of the attaching arm by the actuator means mounted to the blade attaching arm.

3. The rotor control system as defined in claim 1, wherein the control means includes a servo valve for each hydraulic actuator with feedback control from the hydraulic actuator output to the servo valve, each servo valve being connected to a respective hydraulic line.

4. The rotor control system as defined in claim 1, wherein the means for producing rotation of each actuator means further comprises a regeneration valve connected to adjacent actuators for diverting flow between the actuators.

5. The rotor control system as defined in claim 4, wherein each regeneration valve is mounted in the rotor hub.

6. The rotor control system as defined in claim 1, the helicopter including a rotor drive shaft to which the rotor hub is mounted, said rotor drive shaft defining an axis of rotation which coincides with that point of intersection of the longitudinal axis, wherein the hydraulic lines pass through the rotor drive shaft to the rotor hub.

7. The rotor control system as defined in claim 6, wherein the means for producing rotation of each actuator means further comprises a hydraulic reservoir and a column which extends from the hydraulic reservoir through the rotor drive shaft and is rotated thereby, and wherein said hydraulic lines pass through said column to the rotor hub.

8. The rotor control system as defined in claim 6, wherein the pump is driven by said rotor drive shaft.

9. The rotor control system as defined in claim 6, wherein the means for producing rotation of each actuator means further comprises:
an electro-hydraulic circuit with feedback control from the hydraulic actuator output to a further servo valve, each further servo valve being connected to the electro-hydraulic circuit and to a respective hydraulic line; and a mixing valve connected to each actuator and to each servo valve serving said actuator for controlling the hydraulic flow from each servo valve to the actuator.

10. The rotor control system as defined in claim 9, wherein the further servo valves and the mixing valves are mounted in the rotor hub.

11. The rotor control system as defined in claim 10, wherein the electro-hydraulic circuit further includes a fiber optic transmission line which passes through the rotor drive shaft to the rotor hub.

12. The rotor control system as defined in claim 11, wherein the electro-hydraulic circuit further includes at least two control input signals, one of which is pilot input, and a summing circuit which resolves the plural input signals to a single signal for transmission through the fiber optic transmission line to the rotor hub.

13. The rotor control system as defined in claim 12, wherein the electro-hydraulic circuit further includes means mounted in said rotor hub for converting the signal by the fiber optic transmission line into a signal for each further servo valve.

14. The rotor control system as defined in claim 6, further comprising:
a pitch housing mounted to each blade attaching arm for rotation about a respective longitudinal axis by the actuator means mounted to the respective blade attaching arm;
a swashplate;
a plurality of control rods connected to the swashplate and extending through the rotor drive shaft to the rotor hub, said plurality of control rods being equal in number to the number of rotor blades; and
means for connecting the control rods to a respective control means.

15. The rotor control system as defined in claim 14, wherein the means for connecting the control rods to a respective control means includes a plurality of levers mounted to the rotor hub, said plurality of levers being equal in number to the number of rotor blades, one end of each lever being connected to a respective control rod and the other end being connected to a link which is connected to the respective control means.

16. A rotor control system for a helicopter, comprising:
a rotor hub having a plurality of rotor blade attaching arms, each arm defining a longitudinal axis, which axes intersect at the center of the rotor hub;
rotor blade attaching means;
actuator means mounted to each blade attaching arm;
means for actuating each actuator means for producing rotation of the rotor blade attaching means independently of its respective attaching arm and relative to the longitudinal axis of its respective attaching arm; and
a pitch housing mounted to each blade attaching arm for rotation about the longitudinal axis of the attaching arm by the actuator means mounted to the blade attaching arm, and wherein each actuator means includes a rotary actuator having an outer housing connected to its respective attaching arm and an inner housing connected to its respective pitch housing.

17. A rotor hub for the rotor control system of a helicopter, comprising:
a center portion and a plurality of rotor blade attaching arms extending radially outwardly therefrom, each arm defining a longitudinal axis, which axes intersect at the center of the rotor hub;
a plurality of flange portions situated with one between adjacent blade attaching arms such that the number of flange portions equals the number of blade attaching arms, said flange portions serving to support means for controlling the rotation of at least one hydraulic actuator;
actuator means mounted to each blade attaching arm; and
a pitch housing mounted to each blade attaching arm for rotation about the longitudinal axis of the attaching arm by the actuator means mounted to the respective blade attaching arm.

* * * * *